(12) United States Patent
Beltman et al.

(10) Patent No.: US 10,748,434 B2
(45) Date of Patent: Aug. 18, 2020

(54) METHODS, SYSTEMS, AND APPARATUS FOR DRONE COLLISION AVOIDANCE AND ACOUSTIC DETECTION

(71) Applicant: Intel Corporation, Santa Clara, CA (US)

(72) Inventors: Willem M. Beltman, West Linn, OR (US); Maynard C. Falconer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/661,677

(22) Filed: Jul. 27, 2017

(65) Prior Publication Data

US 2019/0035288 A1    Jan. 31, 2019

(51) Int. Cl.
| | |
|---|---|
| G08G 5/00 | (2006.01) |
| B64C 39/02 | (2006.01) |
| H04R 29/00 | (2006.01) |
| G08G 5/04 | (2006.01) |
| B64D 31/06 | (2006.01) |
| H04R 3/00 | (2006.01) |
| G01S 5/18 | (2006.01) |

(52) U.S. Cl.
CPC ......... *G08G 5/0069* (2013.01); *B64C 39/024* (2013.01); *B64D 31/06* (2013.01); *G01S 5/18* (2013.01); *G08G 5/0021* (2013.01); *G08G 5/045* (2013.01); *H04R 3/00* (2013.01); *H04R 29/00* (2013.01); *H04R 2499/13* (2013.01)

(58) Field of Classification Search
USPC .......................................................... 701/3
See application file for complete search history.

(56) References Cited

U.S. PATENT DOCUMENTS

| | | | | |
|---|---|---|---|---|
| 4,188,906 | A | * | 2/1980 | Tachmindji .............. B63H 1/18 |
| | | | | 440/66 |
| 4,979,917 | A | * | 12/1990 | Haynes ..................... B63B 1/38 |
| | | | | 440/38 |
| 5,545,063 | A | * | 8/1996 | Haynes .................... B63H 5/14 |
| | | | | 440/47 |

(Continued)

OTHER PUBLICATIONS

Nanyaporn Intaratep, W. Nathan Alexander and William J. Devenport et al., Experimental Study of Quadcopter Acoustics and Performance at Static Thrust Conditions, Aeroacoustics Conferences, May 30-Jun. 1, 2016, Lyon, France, 22nd AIAA/CEAS Aeroacoustics Conference, American Institute of Aeronautics and Astronauti.*

*Primary Examiner* — Jean Paul Cass
(74) *Attorney, Agent, or Firm* — Hanley, Flight and Zimmerman, LLC

(57) ABSTRACT

Methods, systems, and apparatus for drone collision avoidance and acoustic sensing are disclosed. An example apparatus to detect acoustic data from a drone includes a controller to set a target revolutions per minute (RPM) for a motor of the drone. The controller is to modify the target RPM based on a modulation pattern to cause the motor to rotate a propeller of the drone at a modulated RPM. The modulated RPM creates self-generated noise. The example apparatus also includes a sensor to gather acoustic data and an analyzer to remove the self-generated noise from the acoustic data to create external acoustic data for processing.

15 Claims, 5 Drawing Sheets

(56) References Cited

U.S. PATENT DOCUMENTS

| | | | | |
|---|---|---|---|---|
| 6,819,982 B2* | 11/2004 | Doane | | B64C 13/20 |
| | | | | 244/135 A |
| 7,093,801 B2* | 8/2006 | Schroeder | | B64D 39/00 |
| | | | | 244/135 A |
| 7,152,828 B1* | 12/2006 | Garcia, Jr. | | B64C 39/024 |
| | | | | 244/135 A |
| 7,213,787 B2* | 5/2007 | Carns | | B64D 39/06 |
| | | | | 244/135 A |
| 9,619,996 B1* | 4/2017 | Smith | | A62C 3/02 |
| 9,650,138 B2* | 5/2017 | Yates | | B64D 33/00 |
| 9,655,034 B2* | 5/2017 | Shaw | | H04L 67/141 |
| 9,714,012 B1* | 7/2017 | Hoareau | | H01M 10/4207 |
| 9,764,703 B2* | 9/2017 | Hoareau | | B64C 39/024 |
| 9,812,020 B2* | 11/2017 | Lee | | G08G 5/0069 |
| 9,815,563 B2* | 11/2017 | Yates | | B64D 39/00 |
| 9,816,529 B2* | 11/2017 | Grissom | | F04D 29/665 |
| 9,868,526 B2* | 1/2018 | Yates | | B64C 39/024 |
| 9,889,931 B2* | 2/2018 | Xu | | B64C 39/024 |
| 2003/0089219 A1* | 5/2003 | Gorman | | F41H 11/02 |
| | | | | 89/1.11 |
| 2010/0062683 A1* | 3/2010 | Brundage | | A01K 47/06 |
| | | | | 449/1 |
| 2013/0238168 A1* | 9/2013 | Reyes | | B64C 39/024 |
| | | | | 701/2 |
| 2013/0261853 A1* | 10/2013 | Shue | | B64C 19/00 |
| | | | | 701/3 |
| 2015/0056058 A1* | 2/2015 | Grissom | | F04D 29/665 |
| | | | | 415/1 |
| 2015/0125268 A1* | 5/2015 | Koopmann | | B64C 11/001 |
| | | | | 415/119 |
| 2016/0236790 A1* | 8/2016 | Knapp | | B64C 11/44 |
| 2017/0193707 A1* | 7/2017 | Seiler | | B64C 27/008 |
| 2017/0227638 A1* | 8/2017 | Nicoletti | | G01S 15/89 |
| 2018/0012461 A1* | 1/2018 | Hill | | G08B 13/19604 |
| 2018/0194484 A1* | 7/2018 | Livieratos | | B64C 39/024 |
| 2018/0327081 A1* | 11/2018 | Gartenberg | | B64D 27/24 |

* cited by examiner

METHODS, SYSTEMS, AND APPARATUS FOR DRONE COLLISION AVOIDANCE AND ACOUSTIC DETECTION

FIELD OF THE DISCLOSURE

This disclosure relates generally to drones, and, more particularly, to methods, systems, and apparatus for drone collision avoidance and acoustic detection.

BACKGROUND

In recent years, drones and unmanned aerial vehicles (UAVs) have become more widespread. Current techniques for drone collision avoidance uses global positioning system (GPS) geofencing or cameras.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

As more drones fill our skies, collision avoidance becomes more important. Drones tend to generate a distinct and high amplitude (tonal) acoustic signature due to rotation of the propellers. Detecting and analyzing the acoustic signatures of drones would facilitate drone identification and enable operation of drones at closer distances while avoiding collisions. Furthermore, the use of acoustic signatures offers an attractive, low cost, fail safe (no connectivity required), low power safety mechanism of collision avoidance, particularly as compared to existing methods that require extra GPS and/or camera equipment. Currently, however, drones cannot distinguish the sound from other drones or the environment with microphones due to the listening drone's own propeller noise, which masks the sound from other drones or other ambient sounds that need to be detected.

Disclosed herein are advancements to drone acoustic signal technology, particularly with respect to drone collision avoidance and acoustic sensing and detection. In this disclosure, active control elements are used to distinguish the sound from the listening drone by modulating and controlling its own propellers. Because the propeller modulation is known a priori, the propeller modulation can be used to accurately extract the remaining noise and, thus, sense the environmental sounds and sounds from other drones. In other words, rotation of the propellers is modulated to generate a known acoustic signal, which is then eliminated or filtered from the sensed acoustic signal. What remains are acoustic signals from the environment external to the drone that are indicative of the presence of other drones or other situations or events, such as the presence and movements of a crowd of people, vehicles, etc.

Figure 1:
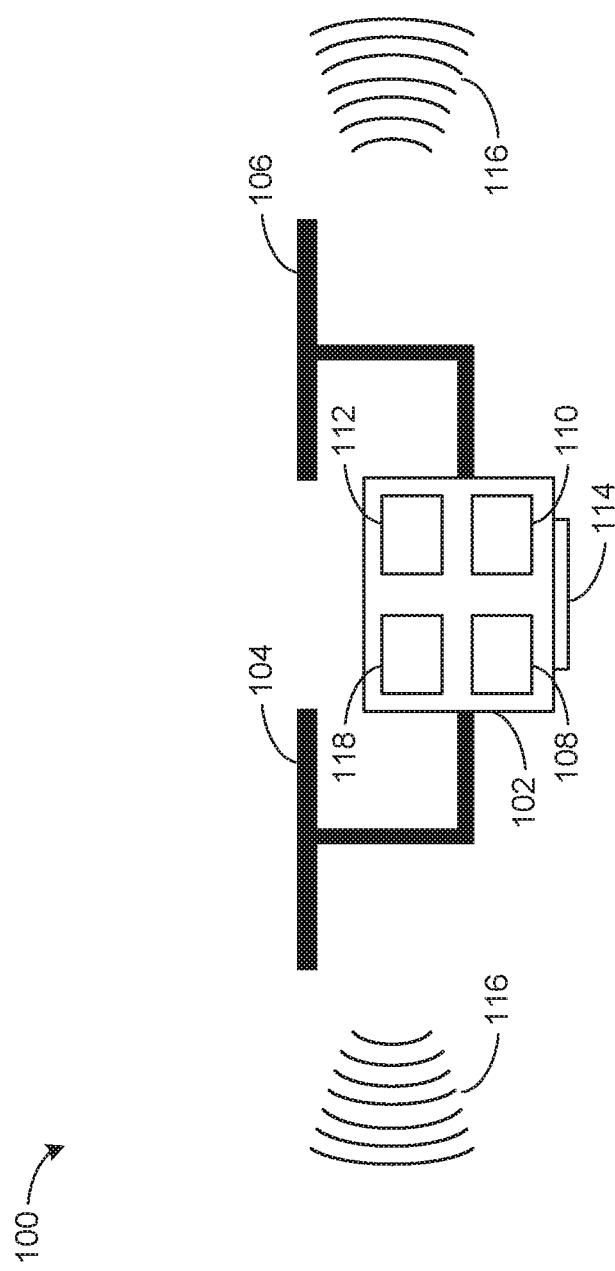
FIG. 1 is a schematic illustration of an example drone in accordance with the teachings of this disclosure.

FIG. 1 is a schematic illustration of an example drone 100 in accordance with the teachings of this disclosure. The example drone 100 disclosed herein is a quadcopter drone (viewed from the side in FIG. 1). However, the teachings of this disclosure are applicable to drones, also referred to as unmanned aerial vehicles (UAVs), with any number of rotors or propellers. The example drone 100 includes a body 102 and, in the view of FIG. 1, an example first set of propellers 104 and an example second set of propellers 106. The body 104 houses and/or carries additional components used in the operation of the drone 100. For example, the body 104 houses an example flight path/speed controller 108, an example motor controller 110, and a motor 112. As disclosed in further detail below, the flight path/speed controller 108 determines the path and speed of a flight and target revolutions per minute (RPM) of the propellers 104, 106. The motor controller 110 controls the motor 112 to effect the target RPMs and/or any other RPMs and motor control as disclosed herein.

The example drone 100 also includes one or more example sensors 114 that gather data from the surrounding environment. In some examples, the sensors 114 include acoustic sensors such as, for example, microphones. In some examples, the sensors 114 are an array of microphones. In other examples, other types of acoustic sensors may be used in addition or alternatively to microphones. Additionally, the sensors 114 may include sensors to gather other types of data, including, for example, visual data, data related to actual RPMs of the propellers, weather data, etc.

During operation of the drone 100, the propellers 104, 106 produce acoustic waves or self-generated noise 116 due to the blade pass frequency and its higher harmonics. The blade pass frequency is the rate at which the propellers (or blades) pass by a fixed position and is equal to the number of propellers multiplied by the RPM of the motor. Thus, the blade pass frequency and, therefore, the self-generated noise 116 varies in intensity with the number of blades of the propellers 104, 106 and the rotation speed. The self-generated noise 116 obfuscates other acoustic signals gathered by the sensors 114. In particular, the self-generated noise 116 conceals acoustic signals in the surrounding environment including, for example, acoustic signals generated by the propellers of other drones, acoustic signals from a crowd of people, acoustic signals from traffic, etc. To process the acoustic signals gathered from the sensors 114, the example drone 100 includes an example acoustic evaluation module 118. The acoustic evaluation module 118, as disclosed in greater detail below, processes the acoustic data gathered from the sensors 114 and removes the self-generated noise 116 to yield external acoustic data for processing, which is unobscured acoustic data from the surrounding environment. The acoustic evaluation module 118 uses a cancellation algorithm in which the tracked RPM data and the modulation pattern are used as reference inputs such as, for example, Blind Source or Separation Kalman filtering.

Figure 2:
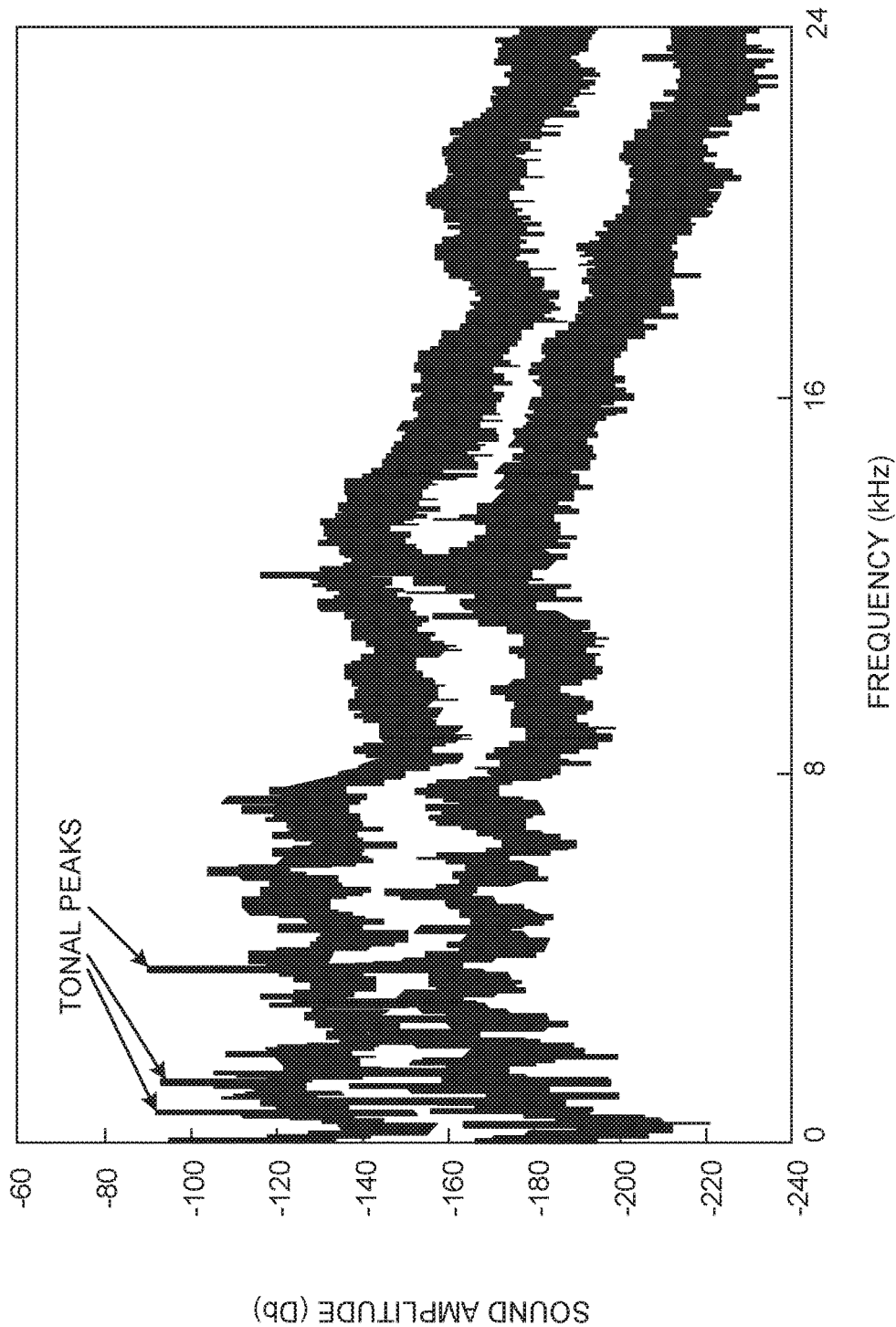
FIG. 2 is a graph of an example sound spectrum.

FIG. 2 is a graph of an example sound spectrum of the self-generated noise 116. The sound spectrum is dominated by peaks at the fundamental blade pass frequency of the drone 100 and its higher harmonics. The amplitude at these frequencies is typically about 10 to 20 decibels (dB) higher than the surrounding broadband noise. Because of the high self-generated noise levels, acoustic sensing has typically not been used on a drone. However, the example drone 100 includes the acoustic evaluation module 118, which advances acoustic technology with drones and enables the drone 100 to analyze external acoustic signals, as disclosed below.

Figure 3:
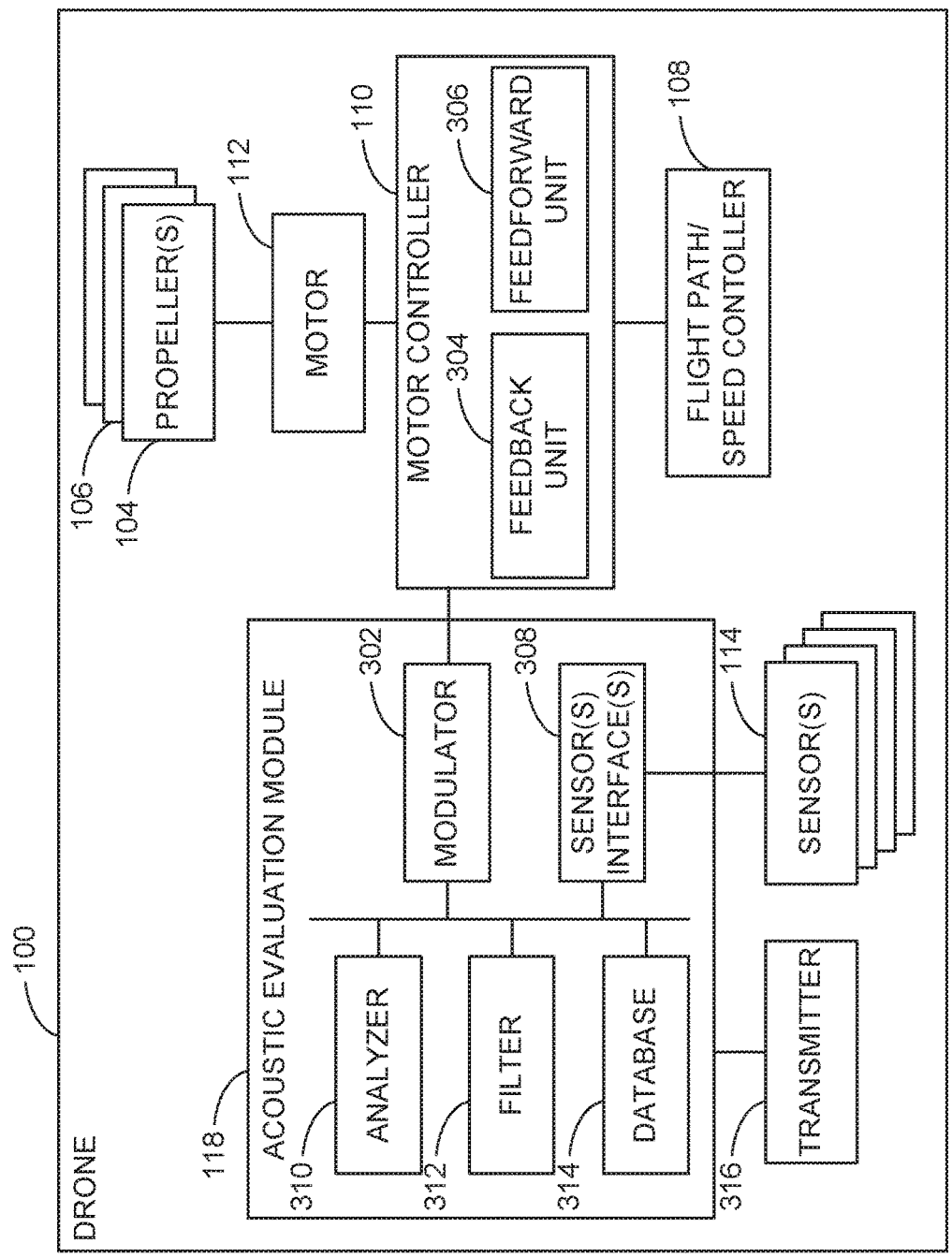
FIG. 3 is a block diagram of the example drone of FIG. 1 with an example drone collision and acoustic detection system.

FIG. 3 is a block diagram of the example drone 100 of FIG. 1, which includes the example acoustic evaluation module 118 to implement an example drone collision and acoustic detection system. As shown in FIG. 3, the example drone 100 includes the flight path/speed controller 108, which may be used to set parameters of a flight of the drone 100. For example, the flight path/speed controller 108 can determine the speed and path for a flight of the drone 100 based on a number of factors including, for example, a desired destination, route, altitude, duration, and/or arrival time. The flight speed/path controller 108 is communicatively coupled to the motor controller 110 and together form means for controlling a target RPM for the motor 112. With the target RPM set, the motor controller 110 can cause the motor 110 or other means for causing rotation of one or more of the propellers 104, 106 to operate in accordance with the target RPM.

In the illustrated example, the target RPM is modulated based on a predetermined or otherwise known pattern or code. To this end, the acoustic evaluation module 118 includes means for generating a modulation pattern such as, for example, the example modulator 302. For example, the modulator 302 can modulate the target RPM using a gold code or gold sequence, which is a type of binary sequence to modulate or otherwise vary the control signal provided by the flight speed/path controller 108 to control the propellers 104, 106. When the propellers 104, 106 are rotating in accordance with the modulation pattern, the self-generated noise 116 produced by the rotation of the propellers 104, 106 forms a distinct acoustic signal, which can be used as a signature of the example drone 100. The modulation pattern is of relatively small deviations so as to not significantly alter the flight path and/or speed.

To ensure that the motor 112 and the propellers 104, 106 are operating in accordance with the modulated pattern, the sensors 114 of the example drone may include RPM sensing that determines the actual speed of the propellers 104, 106. Additionally or alternatively, the motor controller 110 may include one or more of a feedback control unit 304 (such as, for example, a proportional-integral-derivative (PID) control unit) and/or a feedforward control unit 306. Thus, the motor controller 110 can react to or proactively control motor non-idealities and/or external forces to ensure that the desired RPM (e.g., the modulated RPM) is achieved.

The example sensors 114 also include means for gathering acoustic data such as a microphone array, as disclosed above for example. These sensors 114 gather acoustic data, which includes acoustic data from the external environment and the self-generated noise 116. The acoustic evaluation module 118 includes one or more example sensor interface(s) 308 to receive the gathered data including the acoustic data, data related to the actual speed of the propellers 102, 104, and for any other gathered data.

The acoustic evaluation module 118 also includes an example analyzer 310 and an example filter 312, which coordinate as means for processing the acoustic data and parsing the data into subsets including, for example, a subset of the self-generated noise 116. For example, the acoustic data, the motor RPMs and the modulation pattern are analyzed in the analyzer 310 in accordance with a cancellation algorithm to identify the portion of the acoustic data that is attributable to the self-generated noise 116. Example algorithms implemented by the analyzer 310 and filter 312 include Blind Source Separation, Kalman filtering, or any suitable cancellation algorithm in which the tracked RPM data and the modulation pattern are used as reference inputs.

Once the self-generated noise 116 is removed (e.g., subtracted, reduced, etc.) from the acoustic data, the remaining acoustic data is representative of the external environment. Thus, the microphone or other sensors 114 can be used for gathering the external acoustic signal for analysis. For example, the sensors 114 can be used to sense other drones or ground-based activity including counting the number of and/or identifying activity of people or vehicles.

In some examples, the analyzer 310 studies the acoustic signal of the external environment to identify the presence and location of other drones. In a first example, the drone 100 can identify the presence and location of a second drone without direct communication between the drones. In this example, the drone 100 captures acoustic signals from the microphone or other sensors 114, and performs the filtering of the self-generated noise 116 as detailed above. The drone 100 identifies peaks in the spectrum of the remaining acoustic data (i.e., after removal of the self-generated noise 116). In this example, the peaks in the spectrum of the remaining acoustic data are due to rotor noise from the second drone. In other words, the pattern in the spectrum of the remaining acoustic data is an acoustic signature of the second drone indicative of the modulation pattern of the second drone.

To determine the position of the second drone, the analyzer 310 reviews sound pressure and source strength of the acoustic signal of the second drone. The sound pressure is inversely related to distance as shown in Equation 1.

$$P(r)=A/r \qquad \text{Equation 1}$$

where P(r) is sound pressure, r is distance, and A is source strength. The sound pressure level, SPL, is calculated in accordance with Equation 2.

$$SPL=20\times\log 10(P/P_{REF}) \qquad \text{Equation 2}$$

where $P_{REF}=20\times10^{-6}$ Pascals (Pa), the reference sound pressure. The sound pressure level (SPL) falls off with 6 dB per distance doubling (or increased by 6 dB when halving the distance) between the drones. In some examples, stored in an example database 314 of the acoustic evaluation module 118 (along with any other data mentioned herein) is a table that correlates the SPL, measured at a fixed distance, for a number of drones. This table can also provide source strength A as a constant to tell the drone 100 how loud other drones are. The actual distance can then be calculated by the analyzer 310 with the 6 dB doubling per distance rule. If the signature of the second drone is unique (for example based on spectral peaks), the analyzer 310 of the drone would be able to determine the distance, r. In other examples, the reference data is accessed remotely.

In a second example, there is direct and wireless communication between drones, which can be used to determine the distance between the drones. The example drone 100 includes means for transmitting, such as an example transmitter 316. The example drone and the second drone can transmit audible or ultrasonic signals including pings, which could be unique in signature to allow for identification of the drones. The receiving drone monitors the sound signal and senses receipt of the ping. If there is communication and time synchronization between drones, the time that the pings were sent can be transmitted, and the difference between time of sending and receiving can be used to exactly determine the distance, r, in accordance with Equation 3.

$$r=\Delta t \times c0 \qquad \text{Equation 3}$$

where t=time, $\Delta t = t_{RECEIVE} - t_{SEND}$, and c0 is the speed of sound (343 meters per second, m/s).

The positions of other drones can be determined in accordance with the disclosed methods during multiple time intervals. The multiple distance calculations over time can be used to determine flight paths of the other drones and/or to predict trajectories of the drones.

When the drone 100 has accurately identified the presence of a second drone and its distance from the drone 100, and/or a flight path or trajectory of the second drone, the drone 100 can take action if necessary to avoid collision. For example, the analyzer 310 can communicate the distance of the second drone to the flight path/speed controller 108, which can then make modifications to the flight path and/or speed of the listening drone 100 to maintain a safe distance from the second drone.

In addition, example drones implemented in accordance with the teachings of this disclosure can transmit their respective modulation patterns and/or an identification signal based on the modulation patterns that can be used for identification purposes. In some examples, the modulation pattern of the drones can be actively controlled to avoid overlap with the modulation patterns and other sounds of other drones and/or sources of acoustic signals. In some examples, the modulation patterns can be randomly chosen from a large set to reduce the chance of two drones operating the same pattern. In some examples, the modulation patterns or codes can be chosen to have low correlations, such as, for example, gold codes or the codes for code-division multiple access (CDMA). The use of a large number of codes can facilitate coordination among drones in a multi-drone scenario.

While an example manner of implementing the drone 100 of FIG. 1 is illustrated in FIG. 3, one or more of the elements, processes and/or devices illustrated in FIG. 3 may be combined, divided, re-arranged, omitted, eliminated and/or implemented in any other way. Further, the example flight path/speed controller 108, the example motor controller 110, the example sensors 114, the example modulator 302, the example feedback unit 304, the example feedforward unit 306, the example sensors interfaces 308, the example analyzer 310, the example filter 312, the example database 314, the example transmitter and/or, more generally, the example acoustic evaluation module 118 of FIG. 3 may be implemented by hardware, software, firmware and/or any combination of hardware, software and/or firmware. Thus, for example, any of the example flight path/speed controller 108, the example motor controller 110, the example sensors 114, the example modulator 302, the example feedback unit 304, the example feedforward unit 306, the example sensors interfaces 308, the example analyzer 310, the example filter 312, the example database 314, the example transmitter and/or, more generally, the example acoustic evaluation module 118 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example flight path/speed controller 108, the example motor controller 110, the example sensors 114, the example modulator 302, the example feedback unit 304, the example feedforward unit 306, the example sensors interfaces 308, the example analyzer 310, the example filter 312, the example database 314, the example transmitter, and/or the example acoustic evaluation module 118 of FIG. 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example drone 100 of FIG. 1 may include one or more elements, processes and/or devices in addition to, or instead of, those illustrated in FIG. 3, and/or may include more than one of any or all of the illustrated elements, processes and devices.

Figure 4:
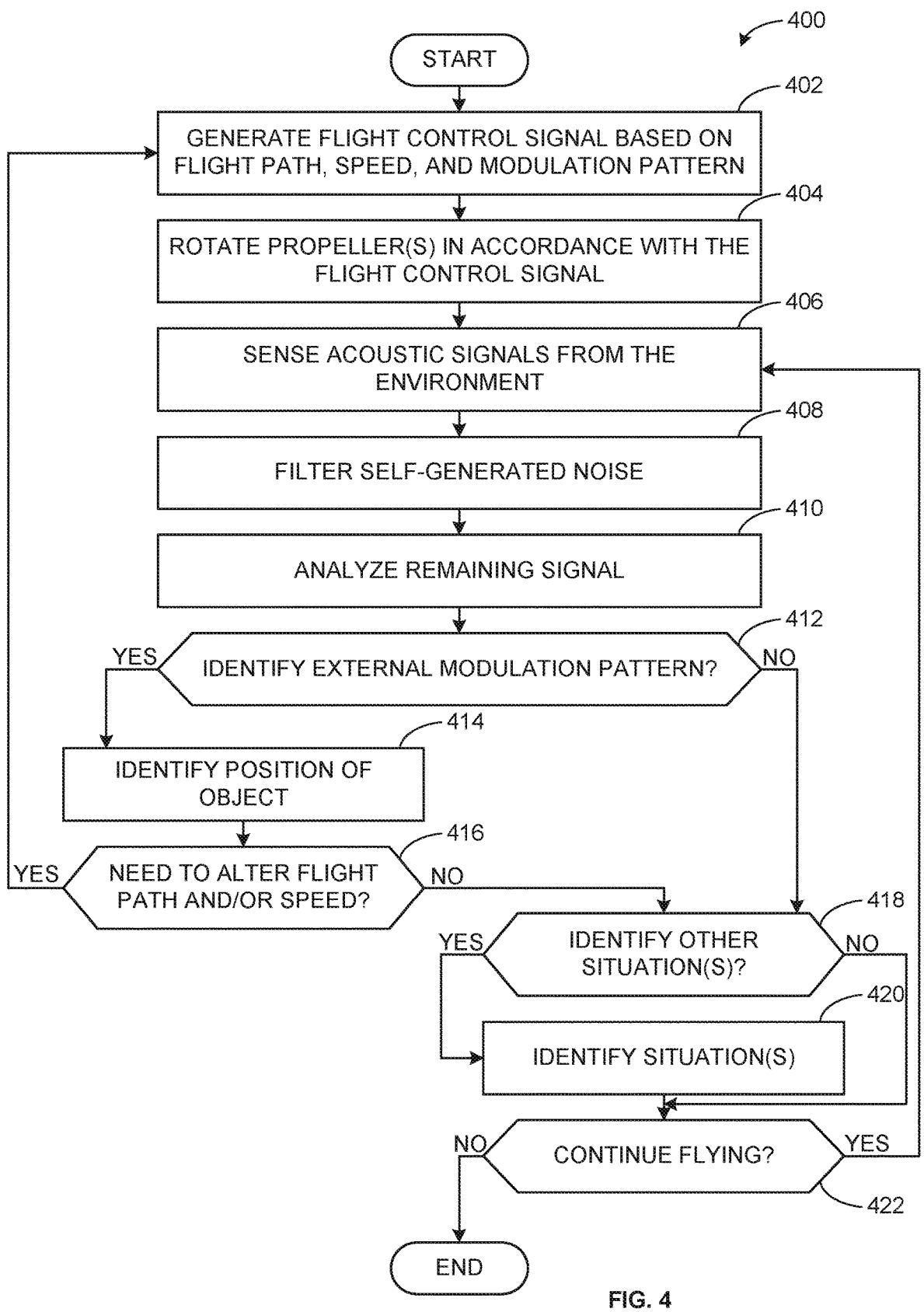
FIG. 4 is a flow chart representative of example machine readable instructions that may be executed to implement the example drone collision and acoustic detection system of FIG. 3.

A flowchart representative of example machine readable instructions for implementing the drone 100 of FIGS. 1 and 3 is shown in FIG. 4. In this example, the machine readable instructions comprise a process or program 400 for execution by a processor such as the processor 512 shown in the example processor platform 500 discussed below in connection with FIG. 5. The program 400 may be embodied in software stored on a non-transitory computer readable storage medium such as a CD-ROM, a floppy disk, a hard drive, a digital versatile disk (DVD), a Blu-ray disk, or a memory associated with the processor 512, but the entire program 400 and/or parts thereof could alternatively be executed by a device other than the processor 512 and/or embodied in firmware or dedicated hardware. Further, although the example program 400 is described with reference to the flowchart illustrated in FIG. 4, many other methods of implementing the example drone 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example program 400 of FIG. 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The example program 400 of FIG. 4 begins with the generation of a flight control signal based on a flight path, speed, and modulation pattern (block 402). For example, the flight path/speed controller 108 establishes a flight path and speed based on a starting location, desired destination, flight time, etc., which is used to determine a target RPM for the flight of the drone. The modulator 302 generates a modulation pattern that is used to modulate the target RPMs of the flight control signal. The example program 400 also includes rotating one or more propeller(s) in accordance with the flight control signal that has been modulated (block 404). For example, the motor controller 110 controls the operation of the motor 112 and, thus, the propellers 104, 106 to cause the propellers 104, 106 to rotate in accordance with the modulated RPMs of the flight control signal.

The example program 400 includes sensing acoustic signals from the environment (block 406). For example, the example drone 100 includes one or more sensor(s) 114 such as, for example, an array of microphones that gather acoustic data from the environment. As disclosed above, the rotation of the propellers 104, 106 generates an acoustic signal that is gathered by the sensor(s) 114 along with other acoustic data from the environment. The example program 400 filters the acoustic data from the propellers 104, 106, which corresponds to the self-generated noise 116 disclosed above using, for example, the analyzer 310 and the filter 312 of FIG. 3 (block 408). The program 400 then analyzes the remaining signal (block 410). For example, the analyzer 310 studies the remaining acoustic data, once the self-generated noise 116 is removed, to identify features of the environment including, for example, the presence of other drones, other objects, and/or ground-based activity as disclosed above.

When analyzing the acoustic signals, the example program 400 determines if an external modulation pattern is identified (block 412). For example, the analyzer 310 can determine if the acoustic signal includes a modulation pattern attributable to an object other than the drone 100. If an external modulation pattern is present (block 412), the example program 400 identifies a position of the object (block 414). For example, the analyzer 310 can implement one or more of the distance calculation techniques disclosed above to identify the position of, for example, a second drone. Once the position of the object is known (block 414), the example program 400 determines if the flight path and/or speed of the drone needs to be adjusted (block 416). For example, the analyzer 310 can determine, based on the position of the object and/or the position of the object over time, whether or not the flight path and/or speed of the drone 100 should be adjusted to avoid a collision with the object and/or otherwise maintain a safe separation from the object. If the example program 400 determines that the flight path and/or speed need to be adjusted (block 416), the program 400 then generates a flight signal in accordance with the adjustment (block 402). For example, the analyzer 310, in communication with the flight path/speed controller 108 and modulator 302, can establish a new flight path and/or speed, which may include the same or a different modulation of the target RPMs.

If the example program 400 determines that the position of the object (identified in block 414) does not necessitate an adjustment to the flight path and/or speed (block 416) of the drone, the example program 400 continues to monitor the acoustic signals to determine if other situation(s) can be identified (block 418). Similarly, if no modulation pattern of another object is identified in the acoustic signals (block 412), the example program 400 also continues to monitor the acoustic signals to determine if other situation(s) can be identified (block 418). For example, the analyzer 310 studies the acoustic signals from the environment to determine ground-based activity as disclosed above. When other situation(s) can be identified (block 418), the example program 400 identifies the situation(s) (block 420). For example, the analyzer 310 can identify crowds and/or a moving vehicle such as, for example, an automobile. In such examples, the analyzer 310 compares one or more characteristic(s) remaining in the acoustic signal after the removal of the self-generated noise 116. The one or more characteristic(s) remaining in the acoustic signal can be compared to known acoustic patterns, frequency spectra, etc. of crowds, automobiles and/or other situations to determine if there is a match.

If other situation(s) cannot be identified (block 418) and/or when any such situation(s) have been identified (block 420), the example program 400 determines if the drone is to continue flying (block 422). For example, the flight path/speed controller 108 determines if the programmed flight path of the drone 100 has been completed. If the drone 100 is to continue flying (block 422), the example program 400 continues to sense acoustic signals from the environment (block 406). If the drone 100 is not to continue flying (block 422), the example program 400 ends.

Figure 5:
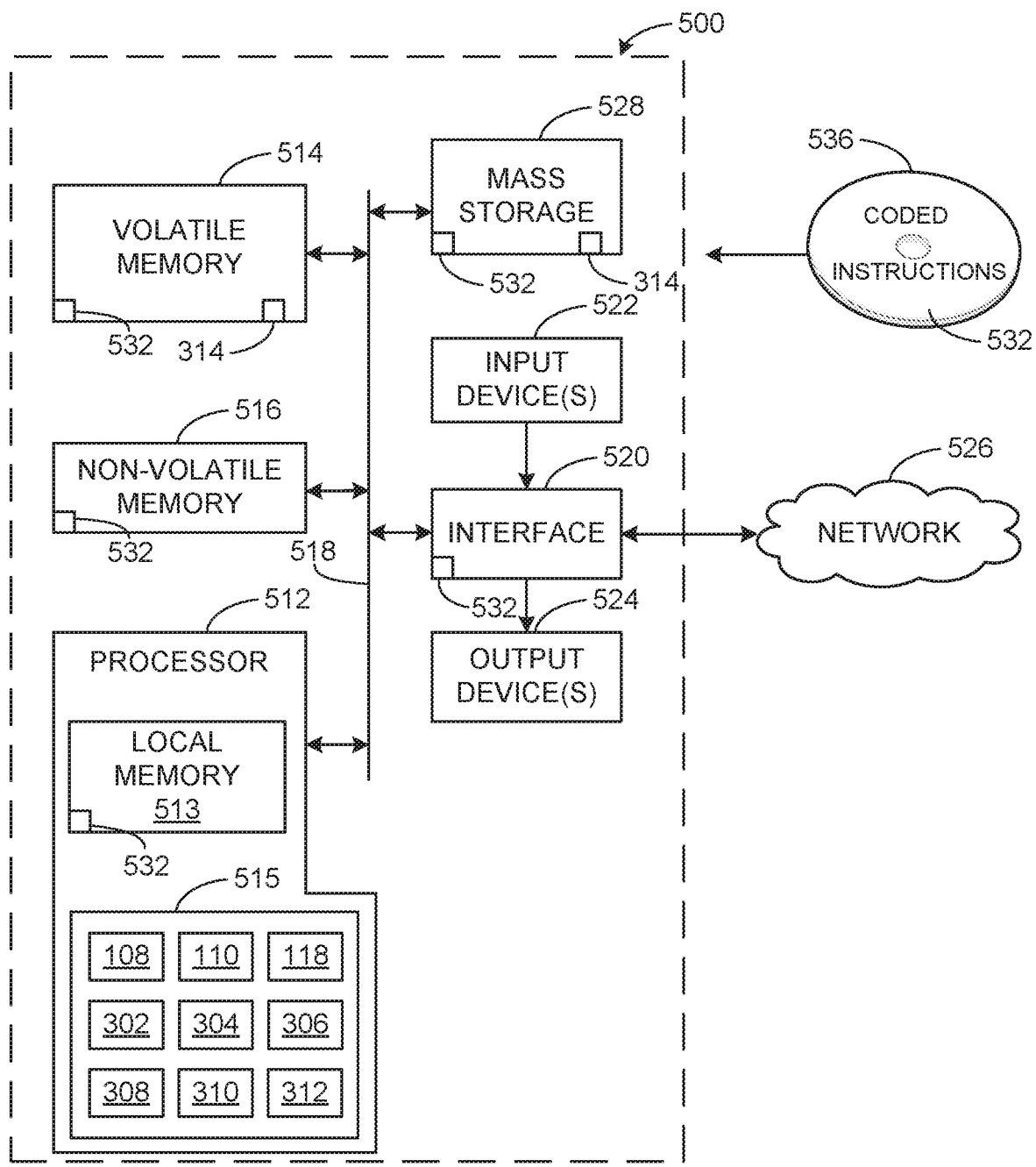
FIG. 5 is a block diagram of an example processor platform structured to execute the example machine readable instructions of FIG. 4 to implement the example drone collision and acoustic detection system of FIG. 3.

FIG. 5 is a block diagram of an example processor platform 500 capable of executing the instructions of FIG. 4 to implement the apparatus of FIGS. 1 and 3. The processor platform 500 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 500 of the illustrated example includes a processor 512. The processor 512 of the illustrated example is hardware. For example, the processor 512 can be implemented by one or more integrated circuits, logic circuits, microprocessors or controllers from any desired family or manufacturer. The hardware processor may be a semiconductor based (e.g., silicon based) device. In this example, the processor implements the example flight path/speed controller 108, the example motor controller 110, the example modulator 302, the example feedback unit 304, the example feedforward unit 306, the example sensors interfaces 308, the example analyzer 310, the example filter 312, and/or the example acoustic evaluation module 118 of FIG. 3.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives.

The coded instructions 532 of FIG. 4 may be stored in the mass storage device 528, in the volatile memory 514, in the non-volatile memory 516, and/or on a removable tangible computer readable storage medium such as a CD or DVD.

From the foregoing, it will be appreciated that example methods, apparatus and articles of manufacture have been disclosed that use acoustic detection for the cancellation of self-generated noise from a drone's own rotor to enable the detection of acoustic singles from other drones and/or ground-based activities. Identification of such other object(s) enhances safety as it enables collision avoidance. Collision avoidance through the disclosed acoustic detection systems and methods is a cost-effective mechanism that does not require cameras, GPS detection equipment, a GPS signal, and/or wireless connectivity. The example acoustic detection systems and methods disclosed herein also operate at low-power and, in some examples, power at an order of magnitude lower than visual approaches. Examples disclosed herein can also enhance auto-navigation of drones.

Example methods, apparatus and articles of manufacture that have been disclosed have the additional benefit of facilitating identification. Because the acoustic signature or modulation pattern of the drone is controlled and known, the acoustic signature, modulation pattern, or an identification signal based on the acoustic signal of the done can be used for identification purposes by other drones as well. With the identification of other drones, a drone can identify a friendly drone from a foe and/or can coordinate flight patterns with other drones during a multi-drone activity.

Examples disclosed here also can be extended to devices other than drones. For example, active (ultrasonic) modulation beacons can be used on autonomous vehicles to detect and identify other vehicles, road conditions, and/or obstacles to prevent collisions.

Example methods, apparatus, systems and articles of manufacture for drone collision avoidance and acoustic sensing are disclosed herein. Further examples and combinations thereof include the following.

Example 1 is a drone acoustic detection system that includes a modulator to cause a propeller of a drone to rotate in accordance with a first modulation pattern. The example acoustic detection system also includes a sensor to gather acoustic data from an environment and an analyzer to identify a first subset of the acoustic data attributable to the first modulation pattern. In addition, the example drone acoustic detection system includes a filter to remove the first subset of the acoustic data from the acoustic data to produce a second subset of the acoustic data. In this example, the analyzer is to further identify a presence of an item based on the second subset of the acoustic data.

Example 2 includes the system of example 1, wherein the analyzer further is to identify the presence of the item by identifying a second modulation pattern in the second subset of the acoustic data.

Example 3 includes the system of example 2, wherein the analyzer further is to identify a distance between the drone and the item.

Example 4 includes the system of example 3, wherein the analyzer further is to determine an alternative flight path of the drone based on the distance.

Example 5 includes the system of any of examples 1-4, wherein the item is a crowd or a vehicle.

Example 6 includes the system of any of examples 1-4, wherein the drone is a first drone and the item is a second drone.

Example 7 includes the system of any of examples 1-4, and further includes a transmitter to transmit an identification signal based on the modulation pattern.

Example 8 is a method of acoustic detection of an item by a drone. The method of example 8 includes modulating the rotation of a propeller of the drone in accordance with a first modulation pattern. The example method includes gathering acoustic data from an environment and identifying, by executing an instruction with a processor, a first subset of the acoustic data attributable to the first modulation pattern. In addition, the example method includes removing, by executing an instruction with the processor, the first subset of the acoustic data from the acoustic data to produce a second subset of the acoustic data, and identifying, by executing an instruction with the processor, a presence of an item based on the second subset of the acoustic data.

Example 9 includes the method of example 8, and further includes identifying a second modulation pattern in the second subset of the acoustic data to identify the item.

Example 10 includes the method of example 9, and further includes identify a distance between the drone and the item.

Example 11 includes the method of example 10, and further includes determining an alternative flight path of the drone based on the distance.

Example 12 includes the method of any of examples 8-11, wherein the item is a crowd or a vehicle.

Example 13 includes the method of any of examples 8-11, wherein the drone is a first drone and the item is a second drone.

Example 14 includes the method of any of examples 8-11, and further includes transmitting an identification signal based on the modulation pattern.

Example 15 is a drone acoustic detection system that includes means for causing a propeller of a drone to rotate in accordance with a first modulation pattern. The example system also includes means for gathering acoustic data from an environment. In addition, the example system includes means for identifying a first subset of the acoustic data attributable to the first modulation pattern, for removing the first subset of the acoustic data from the acoustic data to produce a second subset of the acoustic data, and for identifying a presence of an item based on the second subset of the acoustic data.

Example 16 includes the system of example 15, wherein the means for identifying is to identify the presence of the item by identifying a second modulation pattern in the second subset of the acoustic data.

Example 17 includes the system of example 16, wherein the means for identifying is to further identify a distance between the drone and the item.

Example 18 includes the system of example 17, wherein the means for identifying is to determine an alternative flight path of the drone based on the distance.

Example 19 includes the system of any of examples 15-18, wherein the item is a crowd or a vehicle.

Example 20 includes the system of any of examples 15-18, wherein the drone is a first drone and the item is a second drone.

Example 21 includes the system of any of examples 15-18, and further includes means for transmitting an identification signal based on the modulation pattern.

Example 22 is a non-transitory computer readable storage medium that includes computer readable instructions that, when executed, cause one or more processors to, at least modulate the rotation of a propeller of a drone in accordance with a first modulation pattern, gather acoustic data from an environment, identify a first subset of the acoustic data attributable to the first modulation pattern, remove the first subset of the acoustic data from the acoustic data to produce a second subset of the acoustic data, and identify a presence of an item based on the second subset of the acoustic data.

Example 23 include the storage medium as defined in example 22, wherein the computer readable instructions, when executed, further cause the processor to identify a second modulation pattern in the second subset of the acoustic data to identify the item.

Example 24 includes the storage medium of example 23, wherein the computer readable instructions, when executed, further cause the processor to further identify a distance between the drone and the item.

Example 25 includes the storage medium of example 24, wherein the computer readable instructions, when executed, further cause the processor to determine an alternative flight path of the drone based on the distance.

Example 26 includes the storage medium of any of examples 22-25, wherein the item is a crowd or a vehicle.

Example 27 includes the storage medium of any of examples 22-25, wherein the drone is a first drone and the item is a second drone.

Example 28 includes the storage medium of any of examples 22-25, wherein the computer readable instructions, when executed, further cause the processor to transmit an identification signal based on the modulation pattern.

Example 29 is an apparatus to detect acoustic data from a drone. The apparatus includes a controller to set a target revolutions per minute (RPM) for a motor of a drone and to modify the target RPM based on a modulation pattern to cause the motor to rotate a propeller of the drone at a modulated RPM, the modulated RPM creating self-generated noise. In addition, the example apparatus includes a sensor to gather acoustic data and an analyzer to remove the self-generated noise from the acoustic data to create external acoustic data for processing.

Example 30 includes the apparatus of example 29, wherein the analyzer further is to identify an acoustic signature of an object from the external acoustic data.

Example 31 include the apparatus of example 30, wherein the drone is a first drone, the modulation pattern is a first modulation pattern, and the acoustic signature of the object is a second modulation pattern from a second drone.

Example 32 includes the apparatus of example 31, wherein the analyzer further is to determine a distance between the first drone and the second drone.

Example 33 includes the apparatus of example 32, wherein the controller further is to change a flight path of the first drone to avoid collision between the first drone and the second drone.

Example 34 includes the apparatus of any of examples 29-33, wherein the controller includes a feedforward control unit and a feedback control unit to maintain the modulated RPM.

Example 35 includes the apparatus of any of examples 29-33, wherein the analyzer is to identify ground-based activity based on the external acoustic data.

Example 36 is a method of detecting acoustic data from a drone having a motor and a propeller. The example method includes setting a target revolutions per minute (RPM) for the motor, generating a modulation pattern to modify the target RPM, and modifying the target RPM with the modulation pattern to cause the motor to rotate the propeller at a modulated RPM, the modulated RPM creating self-generated noise. The example method also includes sensing acoustic data; and removing, by executing an instruction with a processor, the self-generated noise from the acoustic data to create external acoustic data for processing.

Example 37 includes the method of example 36, and further includes identifying by executing an instruction with the processor, an acoustic signature of an object from the external acoustic data.

Example 38 includes the method of example 37, wherein the drone is a first done, the modulation pattern is a first modulation pattern, and the acoustic signature of the object is a second modulation pattern from a second drone.

Example 39 includes the method of example 38, and further includes determining by executing an instruction with the processor, a distance between the first drone and the second drone.

Example 40 includes the method of example 39, and further includes changing by executing an instruction with the processor, a flight path of the first drone to avoid collision between the first drone and the second drone.

Example 41 includes the method of any of examples 36-39, and further includes maintaining the modulated RPM with feedforward control and a feedback control.

Example 42 includes the method of any of examples 36-39, and further includes identifying by executing an instruction with the processor, ground-based activity based on the external acoustic data.

Example 43 is a drone that includes a propeller and a motor to rotate the propeller. The example drone also includes means for generating a modulation pattern and means for controlling a target revolutions per minute (RPM) for the motor and for modifying the target RPM based on the modulation pattern to cause the motor to rotate at a modulated RPM, the modulated RPM creating self-generated noise. The example drone also includes means for sensing acoustic data and means for processing the acoustic data to remove the self-generated noise from the acoustic data to create external acoustic data for processing.

Example 44 includes the drone of example 43, wherein the means for processing are to further identify an acoustic signature of an object from the external acoustic data.

Example 45 includes the drone of example 44, wherein the drone is a first drone, the modulation pattern is a first modulation pattern, and the acoustic signature of the object is a second modulation pattern from a second drone.

Example 46 includes the drone of example 45, wherein the means for processing further is to determine a distance between the first drone and the second drone.

Example 47 includes the drone of example 46, wherein the means for controlling further is to change a flight path of the first drone to avoid collision between the first drone and the second drone.

Example 48 includes the drone of any of examples 43-46, wherein the means for controlling includes a feedforward control unit and a feedback control unit to maintain the modulated RPM.

Example 49 includes the drone of any of examples 43-46, wherein the means for processing further is to identify ground-based activity based on the external acoustic data.

Example 50 is a non-transitory computer readable storage medium comprising computer readable instructions that, when executed, cause one or more processors to at least set a target revolutions per minute (RPM) for a motor that is to rotate a propeller of a drone, generate a modulation pattern to modify the target RPM, modify the target RPM based on the modulation pattern to cause the motor to rotate the propeller at a modulated RPM, the modulated RPM creating self-generated noise, gather acoustic data, and remove the self-generated noise from the acoustic data to create external acoustic data for processing.

Example 51 include the storage medium as defined in example 50, wherein the computer readable instructions, when executed, further cause the processor to identify an acoustic signature of an object from the external acoustic data.

Example 52 includes the storage medium as defined in example 51, wherein the drone is a first drone, the modulation pattern is a first modulation pattern, and the acoustic signature of the object is a second modulation pattern from a second drone.

Example 53 includes the storage medium as defined in example 52, wherein the computer readable instructions, when executed, further cause the processor to determine a distance between the first drone and the second drone.

Example 54 includes the storage medium as defined in example 53, wherein the computer readable instructions, when executed, further cause the processor to change a flight path of the first drone to avoid collision between the first drone and the second drone.

Example 55 includes the storage medium as defined in example 50-53, wherein the computer readable instructions, when executed, further cause the processor to maintain the modulated RPM with feedforward control and a feedback control.

Example 56 includes the storage medium as defined in example 50-53, wherein the computer readable instructions, when executed, further cause the processor to identify ground-based activity based on the external acoustic data.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to operate a drone, the apparatus comprising:
a controller to:
select a modulation pattern; and
operate a motor of a drone at a target revolutions per minute (RPM) that tracks the modulation pattern to cause the motor to rotate a propeller of the drone at a plurality of speeds that change over time based on the modulation pattern to create a self-generated noise signature,
wherein the controller includes a feedforward control unit and a feedback control unit to control the plurality of speeds;
a sensor to output an acoustic signal; and
an analyzer to:
generate external acoustic data by removing the self-generated noise signature from the acoustic signal;
attempt to detect a presence of an object based on the external acoustic data; and
identify an acoustic signature of the object from the external acoustic data.

2. The apparatus of claim 1, wherein the drone is a first drone, the object is a second drone, the modulation pattern is a first modulation pattern, and the acoustic signature of the object corresponds to a second modulation pattern from the second drone, the second modulation pattern different from the first modulation pattern.

3. The apparatus of claim 2, wherein the analyzer is to determine a distance between the first drone and the second drone based on the external acoustic data.

4. The apparatus of claim 3, wherein the controller is to change a flight path of the first drone to avoid collision with the second drone based on the distance.

5. A drone, comprising:
a propeller;
a motor to rotate the propeller;
means for generating a modulation pattern to operate the motor at a target revolutions per minute (RPM) and for altering a control signal with the modulation pattern;
feedforward and feedback means for controlling the motor with the control signal altered with the modulation pattern to cause the motor to rotate the propeller at a plurality of propeller speeds that dynamically change over time based on the modulation pattern to create a self-generated noise signature;
means for outputting an acoustic signal; and
means for processing the acoustic signal to:
generate external acoustic data by removing the self-generated noise signature from the acoustic signal;
attempt to detect a presence of an object based on the external acoustic data; and
identify an acoustic signature of the object from the external acoustic data.

6. The drone of claim 5, wherein the drone is a first drone, the object is a second drone, the motor is a first motor, the modulation pattern is a first modulation pattern, and the acoustic signature of the object corresponds to a second modulation pattern of a second motor of the second drone.

7. The drone of claim 6, wherein the processing means is to determine a distance between the first drone and the second drone.

8. The drone of claim 7, wherein the controlling means is to change a flight path of the first drone to avoid collision with the second drone based on the distance.

9. The drone of claim 5, wherein the processing means is to identify ground-based activity based on the external acoustic data.

10. The drone of claim 5, wherein the modulation pattern includes a binary sequence.

11. An apparatus to detect acoustic data from a drone, the apparatus comprising:
- a controller to set a target revolutions per minute (RPM) for a motor of a drone and to modify the target RPM based on a modulation pattern to cause the motor to rotate a propeller of the drone at a changing propeller speed to create a self-generated noise signature;
- a transmitter to broadcast an identification signal based on the modulation pattern;
- a sensor to gather the acoustic data; and
- an analyzer to remove the self-generated noise signature from the acoustic data to create external acoustic data.

12. The apparatus of claim 11, wherein
the analyzer is to:
attempt to detect a presence of an object based on the external acoustic data, and the modulation pattern corresponds to a gold code sequence.

13. The apparatus of claim 12, wherein the controller is to establish a flight path and the rotation of the propeller in accordance with the binary sequence enables the drone to achieve the flight path.

14. The apparatus of claim 12, wherein the controller is to establish a flight speed and the rotation of the propeller in accordance with the binary sequence enables the drone to achieve the flight speed.

15. The apparatus of claim 11, wherein the analyzer is to identify ground-based activity based on the external acoustic data.

* * * * *